Aug. 5, 1969  D. KNÖDLER ET AL  3,459,325
SEAL FOR ENCLOSURES SUBJECTED TO HIGH
PRESSURES AND TEMPERATURES
Filed March 29, 1967

United States Patent Office 3,459,325
Patented Aug. 5, 1969

3,459,325
SEAL FOR ENCLOSURES SUBJECTED TO HIGH
PRESSURES AND TEMPERATURES
Diethelm Knödler, Erlangen, and Alfons Jezussek,
Erlangen-Buchenbach, Germany, assignors to
Siemens Aktiengesellschaft, Berlin, Germany, a
corporation of Germany
Filed Mar. 29, 1967, Ser. No. 626,877
Claims priority, application Germany, Apr. 7, 1966,
S 103,081
Int. Cl. B65d 53/00
U.S. Cl. 220—46
6 Claims

ABSTRACT OF THE DISCLOSURE

An enclosure which is subjected to high pressures and temperatures, such as a nuclear reactor. A pair of means coact to form the enclosure, this pair of means being a vessel means and a cover means for covering the vessel means. An intermediate ring is situated between this pair of means and has a sealing surface directed toward one of the pair of means and forming at least part of a sealed joint therebetween, this sealing surface of the intermediate ring removably carrying a sealing ring in the form of a metalic O-ring. An elastic sealing means extends between the intermediate ring and the other of the pair of means for elastically yielding during relative movement between the pair of means while holding the intermediate ring at the joint in a manner maintaining the tightness thereof, this elastic sealing means providing a sealed relationship between the intermediate ring and the other of the pair of means while elastically compensating for movement between the pair of means in a manner preventing any relative movement between the said one of the pair of means and the intermediate ring. This elastic sealing means is in the form of a thin metallic ring having a pair of opposed edges one of which is welded to the intermediate ring and the other of which is welded to the other of the pair of means and this thin metallic ring which forms the elastic sealing means can have in cross section either the configuration of a semicircle or a corrugated configuration enabling the elastic sealing means to act as a metallic bellows.

---

Figure 2:
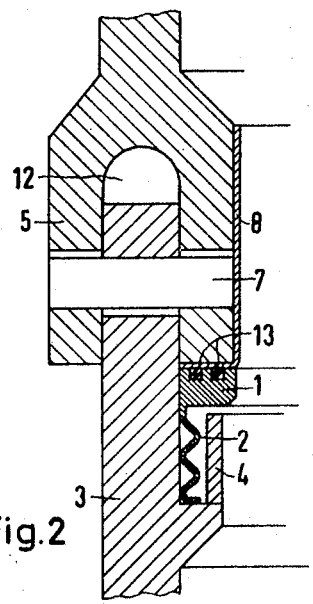

Our invention relates to the sealing of enclosures which are subjected to relatively high pressures and temperatures.

In particular, our invention relates to sealing of an enclosure such as a nuclear reactor. Thus, our invention relates to the sealed joint which is provided between the cover and the vessel of a nuclear reactor.

It is customary to provide in enclosures of this type a double O-ring seal between the cover and vessel of such an enclosure. These O-rings are metallic and are situated in grooves formed, for example, in flanges of the cover and vessel. It is essential to make this structure extremely large and heavy, since otherwise it is possible for one or both of the O-rings to be displaced as a result of turning of a flange of the enclosure as a result of the stresses to which it is subjected due to the high pressures and temperatures. The flange of the cover therefore forms in general a limitation on the manufacture of such highly stressed pressurized enclosures.

It is a primary object of our invention to provide a construction which will avoid these drawbacks.

In addition, it is an object of our invention to provide a sealing structure which is capable of reliably maintaining the tightness of a sealed joint between the cover and vessel of an enclosure of the above type even during relative movement between the cover and vessel as when the cover moves slightly with respect to the vessel due to the stresses to which the enclosure is subjected.

Furthermore, it is an object of our invention to provide a sealing structure which can be used with any types of enclosures whether they are of a generally conventional type or whether they have a relatively unusual combination of details.

In accordance with our invention the enclosure is constituted by a pair of means one of which is a vessel means and the other of which is a cover means for covering the vessel means, and with the structure of our invention at least one intermediate ring is built into the enclosure and situated between the vessel means and cover means thereof. This intermediate ring has an axial thickness which is less than its radial thickness. In accordance with our invention an elastic sealing means extends between the intermediate ring and one of the above-mentioned pair of means for maintaining a sealed relationship therebetween while yielding elastically to compensate for relative movement between the pair of means. The intermediate ring has a sealing surface which is directed toward one of the pair of means while the elastic sealing means connects the intermediate ring with the other of the pair of means, and this sealing surface of the intermediate ring forms at least part of a sealed joint between the pair of means, the elastic means acting automatically to maintain the tightness of this joint even during relative movement between the pair of means while compensating for this movement by yielding elastically. The sealing surface of the intermediate ring removably carries a proven seal in the form of a metallic O-ring, and the elastic sealing means acts to prevent any relative movement between the intermediate ring and that one of the pair of means toward which its sealing surface is directed, so that in this way the tightness of the sealed joint is maintained. As a result of this construction it is possible for the cover means to undergo relatively slight movements, and even a slight lifting with respect to the vessel, without disturbing the sealed joint so that the sealing rings such as the O-ring and other sealing surfaces of the joint remain in sealed engagement with each other.

With the construction of our invention the pressure within the enclosure acts to maintain the sealing surfaces of the sealed joint pressing against each other. The elastic sealing means which connects the intermediate ring to the vessel means, for example, is in the form of a thin metallic ring which has in cross section a configuration enabling it to expand and contract to provide the possibility of relative movement between the intermediate ring and the vessel means. The axial thickness of the intermediate ring is maintained relatively small, so that at a maximum it does not exceed its radial thickness, and in this way any tilting of the intermediate ring as a result of friction forces is reliably prevented.

As a result of this structure of our invention the flange of the cover of the enclosure can be made thinner than is customarily required without in any way risking the maintenance of tightness at the sealed joint. Therefore, it becomes possible to build larger enclosures since the limitations provided with conventional enclosures by the requirements of the connection of the cover to the vessel are no longer present with the structure of our invention. Furthermore, it is possible to use with the structure of our invention connections between the vessel and the cover which can differ considerably from conventional connections.

Figure 1:
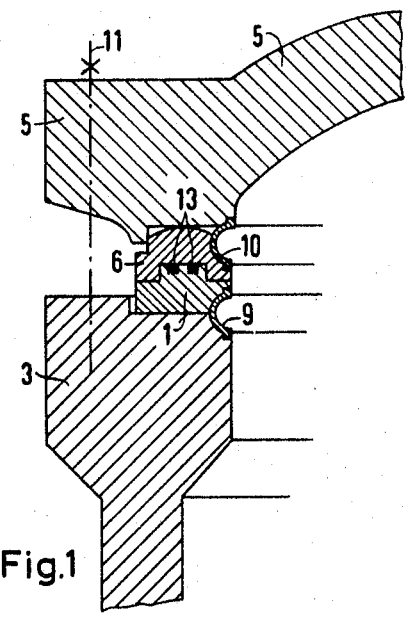

Our invention is illustrated by way of example in the accompanying drawings which form part of this application and in which:

FIG. 1 is a fragmentary sectional elevation of one possible embodiment of a seal according to our invention, the section of FIG. 1 being taken in a plane which extends perpendicularly across the sealing surfaces of the sealed joint at an edge portion of the cover and of the top of the vessel; and FIG. 2 is a fragmentary sectional elevation of another embodiment of a structure according to our invention taken also in a plane which extends perpendicularly through the sealed joint at the region of an edge of the cover and the top edge of the vessel.

Referring now to FIGS. 1 and 2, the enclosure is constituted by a vessel means 3 and a cover means 5 for covering the vessel means 3. An intermediate ring 1 is built into the enclosure and is situated between the pair of means 3 and 5. This intermediate ring 1 of both embodiments has an upwardly directed sealing surface which is directed toward the cover means 5 and it carries an O-ring at this sealing surface.

In the embodiment of FIG. 1 an elastic sealing means 9, in the form of a welded member, connects the intermediate ring 1 to the vessel means 3. In the embodiment of FIG. 2, an elastic sealing means 2, also in the form of a thin metallic ring connects the intermediate ring 1 to the vessel means 3. This ring 2 also has a welded connection to the intermediate ring 1, on the one hand, and to the vessel means 3, on the other hand. In the embodiment of FIG. 2, however, the sealing means 2 is longitudinally corrugated so that it acts as a metallic bellows. Thus, in both embodiments the elastic sealing means 2 and 9 respectively have upper edges welded to the intermediate ring 1 and lower edges welded to the vessel means 3. In particular, the lower edge of both elastic sealing means is welded to the flange at the upper open end of the vessel means, and both welded connections of each elastic sealing means 2 and 9 provide a tight, sealed relationship between the intermediate ring 1 and the vessel means 3.

In the embodiment of FIG. 1 the cover means 5 is fixed to the vessel means 3 in a manner which is substantially conventional. Thus, as is schematically indicated in FIG. 1, the cover means 5 is connected with the flange at the top end of the vessel means 3 by way of bolts 11. In this example, however, there is, in addition to the intermediate ring 1, a second intermediate ring 6 which is connected to the cover means 5 by way of an elastic sealing means 10 which also has a pair of opposed edges respectively welded to the intermediate ring 6 and the cover means 5 in a manner providing a tight, sealed relationship between the intermediate ring 6 and the cover means 5. This second intermediate ring 6 has a downwardly directed sealing surface which forms the surface which is directly engaged by the O-rings which are situated in grooves of and removably carried by the intermediate ring 1 at the sealing surface of the latter. The upper surface of the intermediate ring 6 is convexly curved in radial cross section, as indicated in FIG. 1, so that it is possible in this way for both of the elastically supported intermediate rings to follow in a better manner the titling movements of the cover means 5. It will be noted that the pair of elastic sealing means 9 and 10 are of semicircular cross section and are capable of yielding elastically to compensate for movement of the cover means 5 with respect to the vessel means 3 while maintaining the tightness of the sealed joint. Furthermore, the sealing surface of the intermediate ring 6 is formed with a groove which is filled by an annular projection at the sealing surface of the intermediate ring 1, and it is this projecting portion of the sealing surface of the intermediate ring 1 which removably carries the metallic O-ring 13. As a result of this interengagement of the rings 1 and 6 by way of the annular projection of the ring 1 which is received in the grooeve of the ring 6, the rings 1 and 6 are radially interlocked and cannot be radially displaced one with respect to the other. Furthermore, the elastic sealing means 9 acts to prevent any movement of the intermediate ring 1 with respect to the cover means 5.

FIG. 2 illustrates an embodiment where the connection between the cover means and vessel means is not conventional. In this case the flange at the top open end of the vessel means 3 is received in a downwardly directed groove 12 which is formed at the lower flange of the cover means 5. The upper end flange of the vessel means 3 is secured in the groove 12 by way of a plurality of radially extending pins 7 which pass through aligned openings of the cover means 5 and openings adjacent the top edge of the vessel means 3, in the manner indicated for one of the pins 7 in FIG. 2. The seal between the cover means and vessel means is maintained by way of the intermediate ring 1 which, as pointed out above, is connected with the vessel means 3 by way of the welded sealing means 2 which is in the form of a thin elastic metallic ring which is longitudinally corrugated so as to act in a manner similar to a bellows.

During the time when there is no pressure in the enclosure, when the latter is being installed, an inner ring 4 which is fixed to the interior of the vessel means 3 in the manner shown in FIG. 2 coacts with the intermediate ring 1 so as to prevent the latter from being displaced from its above-described initial position. The surface of the cover means 5 which coacts with the sealing surface of the ring 1 where the removable O-rings 13 are carried is formed by a metallic sheet or coating 8 located at the interior surface of the cover means 5 and along an inner peripheral portion at the lower edge thereof. It will be noted that this sheet 8 serves also to cover the bores of the cover means 5 which receive the pins 7. This sheet 8 can, for example, be composed of a sheet which is fixed to the cover means 5 as by being welded thereto.

Thus, with the embodiment of FIG. 2 the elastic sealing means 2 will compensate also for any movement of the cover means 5 with respect to the vessel means 3 while at the same time maintaining the tightness of the sealed joint by holding the intermediate ring 1 at a position where it has no movement relative to the cover means 5 so that the upper sealing surface of the ring 1 remains at all times in sealed engagement with the surface of the plate 8, as indicated in FIG. 2. Furthermore, it is apparent that in both embodiments the pressure within the container means acts to press the sealing surfaces of the sealed joint against each other.

Of course, it is possible to apply the sealing principles of our invention with structures differing from those described above and shown in the drawings. In all cases, however, the interior pressure of the enclosure augments the sealed engagement between the O-rings and the cover or the intermediate ring joined thereto, so that relatively small tilting or shifting movements of the cover are permissible without disturbing the tightness of the joint. Different degrees of thermal expansion between the components of the enclosure, namely between the vessel means and cover means, do not influence the operation of the seal, since there is practically no possibility of any appreciable stresses therebetween. Furthermore, it is possible to use with our invention cover connections which have not been conventionally used up to the present time.

We claim:

1. In an enclosure which is subjected to relatively high pressures and temperatures, such as a nuclear reactor, a pair of means coacting with each other to form the enclosure and including a vessel means and a cover means for covering said vessel means at least one intermediate ring situated between said pair of means and having a radial thickness which is greater than its axial thickness, said intermediate ring having a substantially spherical surface rollably engaging with a surface of one of said pair of means and having a sealing surface directed toward the other of said pair of means for providing at least part of a sealed joint between said pair of means, said intermediate ring removably carrying a sealing ring at said sealing surface thereof, means for form-locking said intermediate ring with respect to said other of said pair of means against relative displacement therebetween in the plane of said sealing surface, and elastic sealing means extending between said intermediate ring and said one of said pair of means for yielding during relative movement between said pair of means while holding said intermediate ring at said joint in a manner maintaining the tightness thereof, said elastic sealing means coacting with said intermediate ring and said one of said pair of means for maintaining a sealed relationship between said intermediate ring and said one of said pair of means while yielding elastically during relative movement between said pair of means.

2. The combination of claim 1 and wherein said sealing ring which is removably carried by said intermediate ring at said sealing surface thereof is in the form of a metallic O-ring.

3. The combination of claim 1 and wherein a second intermediate ring is situated between said first-mentioned intermediate ring and said other of said pair of means and wherein a second elastic sealing means extends between said second intermediate ring and said other of said pair of means for providing therebetween an elastically yieldable sealed connection, said second ring having a sealing surface directed toward said first-mentioned ring and engaged by said sealing ring which is removably carried thereby, one of said sealing surfaces being formed with a groove and the other of said sealing surfaces extending into and filling said groove for preventing radial displacement between said intermediate rings.

4. The combination of claim 3 and wherein said first-mentioned elastic sealing means has a welded connection on the one hand to said one of said pair of means and on the other hand to said first-mentioned intermediate ring while said second elastic sealing means also has a welded connection on the one hand to said other of said pair of means and on the other hand to said second intermediate ring.

5. The combination of claim 4 and wherein each of said elastic sealing means is in the form of a relatively thin metal ring of substantially semicircular cross section having a pair of opposed edges where said welded connections are situated.

6. The combination of claim 1 and wherein said elastic sealing means is in the form of a ring of relatively thin metal having a pair of opposed edges one of which is welded to said intermediate ring and the other of which is welded to said one of said pair of means.

References Cited

UNITED STATES PATENTS

| | | | |
|---|---|---|---|
| 1,926,107 | 9/1933 | Morehead | 220—46 X |
| 2,352,583 | 6/1944 | Zetterquist | 220—46 X |
| 2,553,222 | 5/1951 | Wallgren | 220—46 X |
| 2,818,993 | 1/1958 | Alt | 220—46 |
| 3,079,033 | 2/1963 | Wootton | 220—46 |
| 3,127,050 | 3/1964 | McDaniels | 220—46 X |

FOREIGN PATENTS 847,093   8/1952   Germany.

GEORGE E. LOWRANCE, Primary Examiner